US009575800B2

(12) United States Patent
Brown et al.

(10) Patent No.: US 9,575,800 B2
(45) Date of Patent: Feb. 21, 2017

(54) USING QUEUES CORRESPONDING TO ATTRIBUTE VALUES AND PRIORITIES ASSOCIATED WITH UNITS OF WORK AND SUB-UNITS OF THE UNIT OF WORK TO SELECT THE UNITS OF WORK AND THEIR SUB-UNITS TO PROCESS

(71) Applicant: International Business Machines Corporation, Armonk, NY (US)

(72) Inventors: Theresa M. Brown, Tucson, AZ (US); Nicolas M. Clayton, Warrington (GB); Joshua J. Crawford, Tucson, AZ (US); Lokesh M. Gupta, Tucson, AZ (US); Theodore T. Harris, Jr., Tucson, AZ (US); Brian D. Hatfield, Tucson, AZ (US); Matthew Sanchez, Tucson, AZ (US); David B. Schreiber, Tucson, AZ (US); Matthew J. Ward, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 14/277,026

(22) Filed: May 13, 2014

(65) Prior Publication Data
US 2015/0331716 A1    Nov. 19, 2015

(51) Int. Cl.
*G06F 9/46* (2006.01)
*G06F 9/48* (2006.01)

(52) U.S. Cl.
CPC ............... *G06F 9/48* (2013.01); *G06F 9/4881* (2013.01)

(58) Field of Classification Search
None
See application file for complete search history.

(56) References Cited

U.S. PATENT DOCUMENTS 4,387,427 A * 6/1983 Cox ..................... G06F 9/468
718/102
5,937,428 A   8/1999 Jantz
(Continued)

FOREIGN PATENT DOCUMENTS

WO    2004109473    12/2004

OTHER PUBLICATIONS

G. Castets, et al., "IBM TotalStorage Enterprise Storage Server PPRC Extended Distance", IBM Corp., Jun. 2002, Total 184 pages.
(Continued)

*Primary Examiner* — Van Nguyen
(74) *Attorney, Agent, or Firm* — David W. Victor; Konrad Raynes Davda & Victor LLP

(57) ABSTRACT

Provided are a computer program product, system, and method for using queues corresponding to attribute values and priorities associated with units of work and sub-units of the unit of work to select the units of work and their sub-units to process. There are a plurality of work unit queues, wherein each of the work unit queues are associated with different work unit attribute values that are associated with units of work, wherein a plurality of the work unit queues include records for units of work to process having work unit attribute values associated with the work unit attribute values of the work unit queues, and wherein the work unit queues are each associated with a different priority. A record for a unit of work to perform is added to the work unit queue associated with a priority and work unit attribute value associated with the work unit.

23 Claims, 13 Drawing Sheets

(56) References Cited

U.S. PATENT DOCUMENTS

| | | | |
|---|---|---|---|
| 6,745,258 | B1 | 6/2004 | Pellegrino et al. |
| 6,981,074 | B2* | 12/2005 | Oner .................. G06F 13/28 370/218 |
| 6,985,900 | B2* | 1/2006 | Codd .................. G06F 9/44 706/45 |
| 7,127,507 | B1* | 10/2006 | Clark .................. H04L 43/045 709/224 |
| 7,302,448 | B2* | 11/2007 | Schwendiman .... G06F 9/44505 |
| 7,380,156 | B2 | 5/2008 | Rodrigues et al. |
| 7,389,507 | B2 | 6/2008 | Dickson |
| 7,499,951 | B2* | 3/2009 | Mueller .............. G06Q 10/06 705/7.11 |
| 7,730,257 | B2 | 6/2010 | Franklin |
| 7,765,549 | B1* | 7/2010 | Lauer .................. G06F 9/5005 707/705 |
| 7,827,282 | B2* | 11/2010 | Sorrentino .......... G06Q 10/06 709/223 |
| 7,840,526 | B1 | 11/2010 | Baltazar et al. |
| 8,127,305 | B1* | 2/2012 | Leonard ............... G06F 9/546 709/226 |
| 8,230,426 | B2 | 7/2012 | Powers et al. |
| 8,356,126 | B2 | 1/2013 | Ashmore |
| 8,473,648 | B2 | 6/2013 | Chakhaiyar et al. |
| 8,516,189 | B2 | 8/2013 | Sarkar |
| 8,700,834 | B2 | 4/2014 | Horn et al. |
| 8,751,861 | B2 | 6/2014 | Nair et al. |
| 8,805,793 | B2 | 8/2014 | Patiejunas et al. |
| 8,839,249 | B2* | 9/2014 | Mills .................. G06Q 10/06 705/7.26 |
| 8,910,168 | B2* | 12/2014 | Mital .................. G06F 9/46 718/101 |
| 9,268,503 | B2 | 2/2016 | Klemm et al. |
| 2002/0178282 | A1 | 11/2002 | Mysore et al. |
| 2004/0133680 | A1* | 7/2004 | Sorrentino .......... G06Q 10/06 709/226 |
| 2005/0102398 | A1 | 5/2005 | Zhang et al. |
| 2007/0050773 | A1 | 3/2007 | Tayyar et al. |
| 2007/0133781 | A1 | 6/2007 | Febonio et al. |
| 2011/0225583 | A1* | 9/2011 | Suh .................. G06F 9/4887 718/1 |
| 2011/0286444 | A1 | 11/2011 | Petrovykh |
| 2013/0125127 | A1* | 5/2013 | Mital .................. G06F 9/46 718/102 |
| 2014/0189695 | A1* | 7/2014 | Xu .................. G06F 9/52 718/102 |
| 2015/0277984 | A1 | 10/2015 | Abraham et al. |

OTHER PUBLICATIONS

"A Method and System for the Optimal Background Copy Via Adjusting PPRC Path Automatically", dated Jan. 26, 2012, An IP.com Prior Art Database Technical Disclosure, Total 6 pages.

Matta, I et al., "Differentiated Predictive Fair Service for TCP Flows", dated 2000, Computer Science Department Boston University, Boston, MA, Total 10 pgs.

Motorola, Inc., et al., "QOS and Fairness for CDMA Packet Data", dated May 1, 2000, An IP.com Prior Art Database Technical Disclosure, Total 8 pages.

US Patent Application Serial No. Unknown, filed May 13, 2014, titled "Using Queues Corresponding to Attribute Values Associated With Units of Work to Select the Units of Work to Process", by inventors T.M. Brown, et al.

US Patent Application Serial No. Unknown, filed May 13, 2014, titled "Using Attribute Value Queues Corresponding to Attribute Values Associated With Units of Work and Sub-Units of the Unit of Work to Select the Units of Work and Their Sub-Units to Process", by inventors T.M. Brown, et al.

Office Action dated Feb. 1, 2016, pp. 12 for U.S. Appl. No. 14/277,023, filed May 13, 2014.

Thomasian, "Priority Queueing in Raid5 Disk Arrays with an NVS Cache", 1995 IEEE, pp. 168-172.

Zhenjie et al., "An Optimization Load Balancing Algorithm Design in Massive Storage System", 2009 IEEE, pp. 310-313.

Ming et al., "Queue Network Modeling Approach to Analysis of the Optimal Stripe Unit Size for Disk Arrays Under Schronous I/O Workloads", 2006 IEEE, 7 pages.

Response dated May 2, 2016, pp. 13, to Office Action dated Feb. 1, 2016, pp. 12 for U.S. Appl. No. 14/277,023, filed May 13, 2014.

Notice of Allowance dated Jul. 1, 2016, pp. 14 for U.S. Appl. No. 14/277,023, filed May 13, 2014.

Response dated Jun. 27, 2016, pp. 14, to Office Action dated Feb. 26, 2016, pp. 24, for U.S. Appl. No. 14/277,018, filed May 13, 2014.

Office Action dated Feb. 26, 2016, pp. 24, for U.S. Appl. No. 14/277,018, filed May 13, 2014.

L. Wang, et al., "Influence of virtual networks to internet collective behavior", Acta Phys. Sin., 2007, 56(1): 36-42.

Final Office Action dated Oct. 5, 2016, pp. 27, for U.S. Appl. No. 14/277,018, filed May 13, 2014.

\* cited by examiner

USING QUEUES CORRESPONDING TO ATTRIBUTE VALUES AND PRIORITIES ASSOCIATED WITH UNITS OF WORK AND SUB-UNITS OF THE UNIT OF WORK TO SELECT THE UNITS OF WORK AND THEIR SUB-UNITS TO PROCESS

BACKGROUND OF THE INVENTION

1. Field of the Invention

The present invention relates to a computer program product, system, and method for using queues corresponding to attribute values and priorities associated with units of work and sub-units of the unit of work to select the units of work and their sub-units to process.

2. Description of the Related Art

To perform work in a workload management environment, the workload manager may queue units of work in a work queue and then select the units of work from the queue to process. A workload process may search through the queued data to find a "best candidate" to process, using an algorithm to provide the required fairness. One drawback of this type of "best candidate" selection process is that it requires searching through large amounts of queued data looking for the "best candidate". Another aged selection criteria that may be used in conjunction with best candidate algorithm selects queued data that has been on the queue for an excessive duration. The combination of these two algorithms independently working on the queue may yield unpredictable selection results.

When processing a volume to transfer having extents spread across ranks of disks in a Redundant Array of Independent Disk (RAID) configuration, the volume may be divided into parts to process and the parts may be processed according to their RAID rank. In certain implementations, there may be part agents to process different parts of the volume, and each part agent would process tracks in a RAID rank assigned to that part process.

There is a need in the art for improved techniques for queuing units of work to process.

SUMMARY

Provided are a computer program product, system, and method for using queues corresponding to attribute values and priorities associated with units of work and sub-units of the unit of work to select the units of work and their sub-units to process. There are a plurality of work unit queues, wherein each of the work unit queues are associated with different work unit attribute values that are associated with units of work, wherein a plurality of the work unit queues include records for units of work to process having work unit attribute values associated with the work unit attribute values of the work unit queues, and wherein the work unit queues are each associated with a different priority. A record for a unit of work to perform is added to the work unit queue associated with a priority and work unit attribute value associated with the work unit.

DETAILED DESCRIPTION

Described embodiments provide techniques for queuing units of work and sub-units of the units of work on multiple queues corresponding to attribute values and priorities associated with the units of work and their sub-units. A workload manager may then cycle through the queues to select units of work and sub-units of work to process. This allows for workload balancing based on different attribute values for different attribute types and priorities associated with a unit of work and sub-unit of work.

Figure 1:
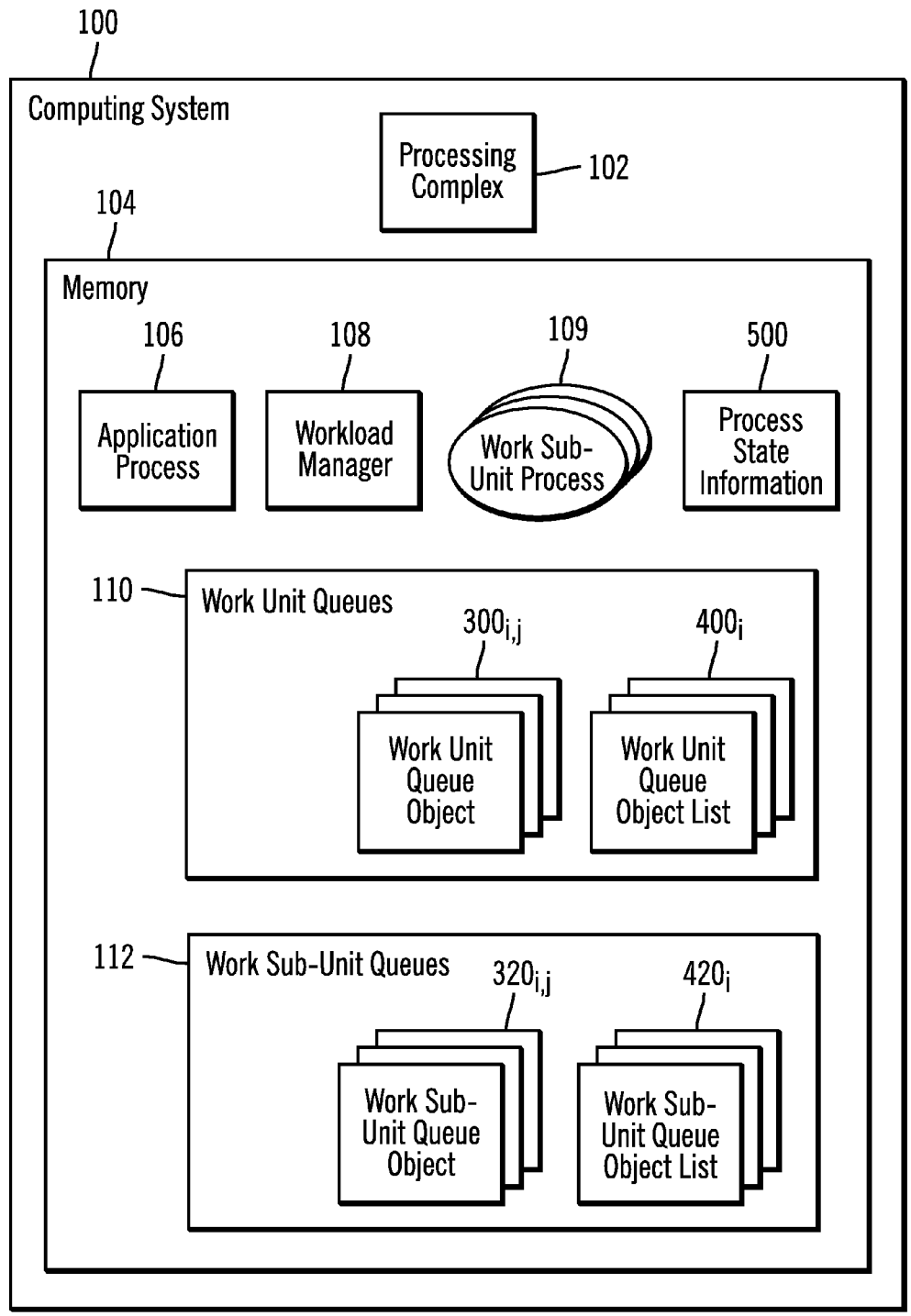
FIG. 1 illustrates an embodiment of a workload processing computing environment.

FIG. 1 illustrates an embodiment of a computing environment for processing units of work which are comprised of sub-units of work, including a computing system 100 having a processor complex 102, comprising one or more microprocessor units, and a memory 104. The memory 104 includes programs to execute, including an application process 106 that creates units of work to process that are submitted to a workload manager 108 to schedule the execution of the units of work from the application process. The workload manager 108 may break the unit of work from the application process 106 into multiple sub-units of work and then invoke work sub-unit processes 109 to independently process the sub-units of work.

The units of work to process may comprise a computing task, application operation, storage access operation, database access operation, data movement operation, or any other type of computing operation with respect to data and computing resources. Each unit of work may be associated with a plurality of attributes for the unit of work, such as a device that would be used to process the unit of work (e.g., memory, storage, adapters, processors, etc), customers or users associated with the unit of work, resources that would be allocated to the unit of work, etc. Sub-units of a unit of work comprise smaller portions or parts of a large unit of work.

To balance processing of units of work and their sub-units according to different attribute values of attribute types and priorities, the workload manager 108 may maintain a plurality of work unit queue objects $300_{i,j}$, for the different attribute types 1 . . . n and for the units of work, where each object includes a plurality of priority queues for different priorities associated with the units of work or sub-units of work. In one embodiment, for each attribute type i, there may be one work unit attribute value j queue for each work unit attribute value j that may be assigned for the work unit attribute type i, and a priority k of the work unit. The priority k may be based on the priority of the state of the process that submitted the unit of work, which may be indicated in the process state information 500. This allows one queue for each work unit attribute value and priority that may be assigned to the unit of work, to allow queuing by attribute type i, attribute value j, and priority k associated with the unit of work. The workload manager 108 may maintain work unit queues 110 having work unit queues that balance selection of queued units of works from the work unit queues to balance unit of work selection by attribute values and priorities associated with the units of work.

Further, the workload manager 108 may maintain work sub-unit queues 112 including work sub-unit queue objects $320_{i,j}$ for the possible work sub-unit attribute values j for an attribute type j, where each work sub-unit queue object $320_{i,j}$ includes a plurality of priority queues for different priorities k that may be associated with the sub-units of work, so that a record for a sub-unit of work is queued in the work sub-unit queue for the attribute type i, attribute value j and priority k associated with the sub-unit of work. This allows the workload manager 108 to balance selection of queued sub-units of work from the work sub-unit queues to balance sub-unit of work selection by attribute values and priorities associated with the sub-units of work. The priority of a sub-unit of work may be based on the priority assigned to the unit of work containing the sub-unit of work, such as the same priority or a priority derived form the unit of work priority. In one embodiment, there may be only one attribute type for the units of work, and in such case i remains one.

Figure 2:
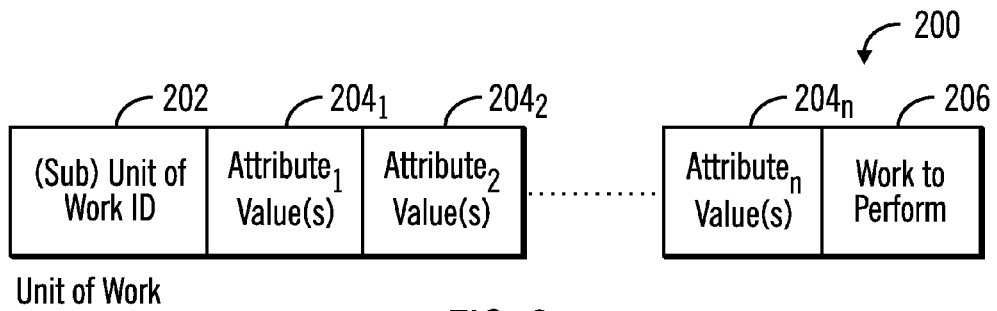
FIG. 2 illustrates an embodiment of a representation of a unit of work to process.

FIG. 2 illustrates an embodiment of a unit or sub-unit of work 200 including information and metadata on the unit of work to process, including a unit or sub-unit of work identifier (ID) 202, one or more attribute values associated with the unit of work for each attribute type $204_1 \ldots 204_n$, and the work to perform 206, which may provide the necessary information needed by the workload manager 108 to process the unit of work, like operation to perform, pointer to operation, code to execute, data transfer operation to perform, etc. For a unit of work, the work to perform 206 may indicate the sub-units of work for the unit of work. For a sub-unit of work, the work to perform 206 may comprise the specific work for a sub-unit of work. Each unit of work may comprise a unique set of sub-units of work.

Figure 3:
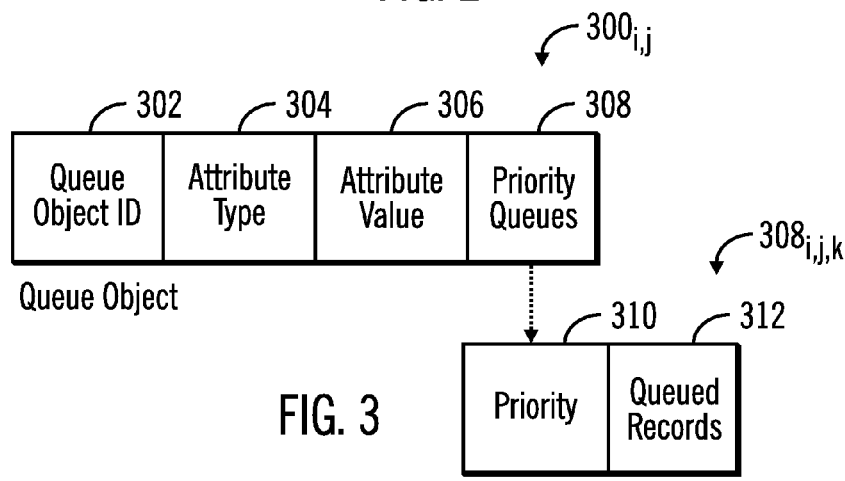
FIG. 3 illustrates an embodiment of a queue.

FIG. 3 illustrates an embodiment of a work unit queue object $300_{i,j}$, for attribute type i, attribute value j, which includes a queue ID 302, an attribute type 304, and attribute value 306 and a plurality of priority queues $308_{i,j,k}$, where each work unit queues $308_{i,j,k}$ is associated with a different priority k. Thus, there may be multiple queues $308_{i,j,k}$, one for each of the attribute values j for the attribute type i, and multiple queues having different priorities k for each attribute value j of an attribute type i. Each record in the queue $308_{i,j,k}$ identifies a (sub) unit of work 200 to process. The workload manager 108 may process the first record in the queue $308_{i,j,k}$. FIG. 3 also illustrates the format of a work sub-unit queue object $320_{i,j}$. In one embodiment, there may be only one attribute type for the work sub unit queues, such that the attribute type i for the work sub-unit queues $308_{i,j,k}$ is constant. Records in the queues $308_{i,j,k}$ may be ordered according to a basis, such as last in first out (LIFO).

Figure 4:
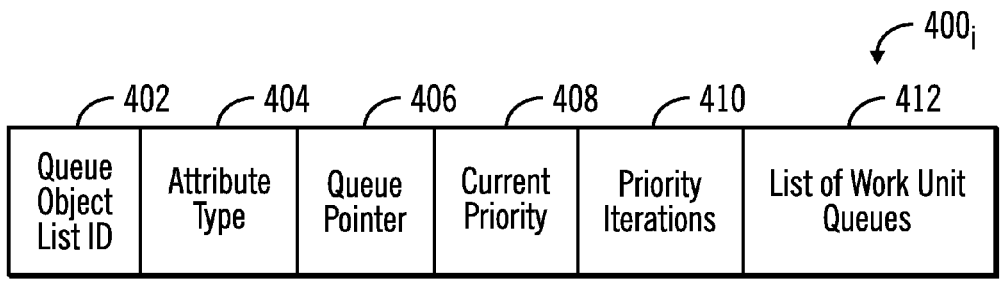
FIG. 4 illustrates an embodiment of a queue object list.

FIG. 4 illustrates an embodiment of a work unit or work sub-unit queue object list $400_i$, the workload manager 108 maintains for each attribute type i, shown as work unit $400i$ and work sub-unit $420i$ queue object lists in FIG. 1. A queue object list $400_i$ for an attribute i includes an identifier 402 identifying the queue object list; an attribute type 404 or attribute type i; a queue pointer 406 identifying the work unit queue objects $300_{i,j}$ or work sub-unit queue objects $320_{i,j}$ for attribute value i having a record in one of the priority queues $308_{i,j,k}$ in an ordered list 412 of work unit queue objects $300_{i,j}$; a current priority 408 indicating the priority queues currently being processed in the list $400_i$; and priority iterations 410 indicating a number of times the list 412 has been processed at the current priority 408. The list 412 may be ordered according to an order in which indication of the queue object was added to the queue object list $400_i$ or $420_i$, such as a last-in-first out (LIFO) ordering. The queue pointer 406 may be initialized to point to the first item in the ordered list 412, the current priority 408 may be initially set to the highest priority, and the priority iterations 410 may be initialized to zero.

Figure 5:
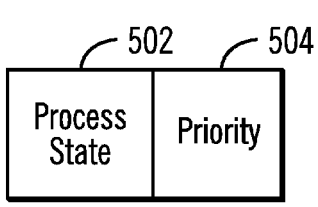
FIG. 5 illustrates an embodiment of process state information.

FIG. 5 illustrates an embodiment of an instance $500_i$ of process state information which provides a process state 502 indicating a state of a process that submits a unit of work to process, where such a process may transition to different computational states and a priority 504 associated with that process state 502. This priority 504 information may be used to determine the priority k of the work unit queue $300_{i,j,k}$ and work sub-unit queue $320_{i,j,k}$ on which the submitted unit and sub-unit of work will be placed.

Figure 6:
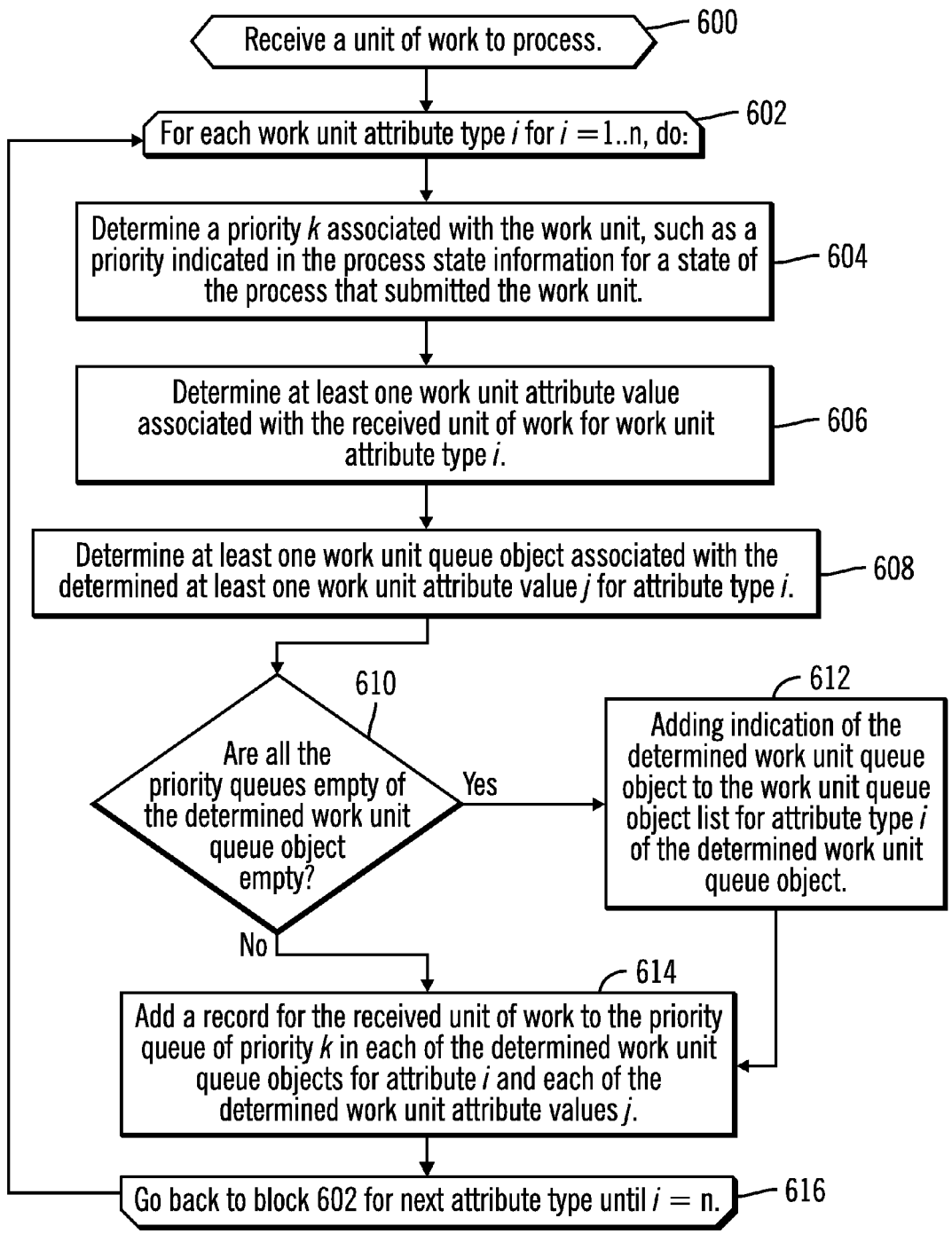
FIG. 6 illustrates an embodiment of operations to place a received unit of work on the queues.

FIG. 6 illustrates an embodiment of operations performed by the workload manager 108 to queue a new received unit of work 200 in the priority queues $300_{i,j,k}$. A loop of operations is performed at blocks 602 through 614 for each attribute type i of the n attribute types for which one or more work unit attribute values are associated with the unit of work 200. At block 604, a determination is made of a priority k associated with the work unit, such as a priority 504 indicated in the process state information 500 for a state 502 of the process that submitted the work unit. A determination is further made (at block 606) of at least one work unit attribute value $204_i$ associated with the received unit of work for attribute type i. The workload manager 108 then determines (at block 608) at least one work unit queue object $300_{i,j}$ associated with the determined at least one work unit attribute value j (indicated in field $204j$) of the received unit of work 200 for attribute type i. If (at block 610) all of the priority queues $308_{i,j,k}$ of the determined work unit queue object $300_{i,j}$ are empty, then the workload manager 108 adds (at block 612) indication of the determined work unit queue objects $300_{i,j}$ whose priority queues 308 are all empty to the work unit queue object list $400_i$ for work unit attribute type i. The queue object list $400_i$ indicates the work unit queue objects $300_{i,j}$ for work unit attribute i and value j whose priority queues 308 have records for units of work to process.

If (at block 610) the determined work unit queue object $300_{i,j}$ does not have all empty priority queues 308 or after adding indication of the work unit queue object $300_{i,j}$ to the queue object list $400_i$ (at block 612), the workload manager 108 adds (at block 614) a record for the received unit of work 200 to the queued records 308 to the priority queue k in each of the work unit queue objects $300_{i,j}$ for attribute type i and each of the determined attribute values j. Control then proceeds (at block 616) back to block 604 until processing is performed for all n work unit attribute types. In this way, a record for a unit of work may be added to multiple different priority queues for different attribute values for different attribute types and for different priorities to allow for selection for processing by the workload manager 108 when processing the queues $308_{i,j,k}$.

Figure 7:
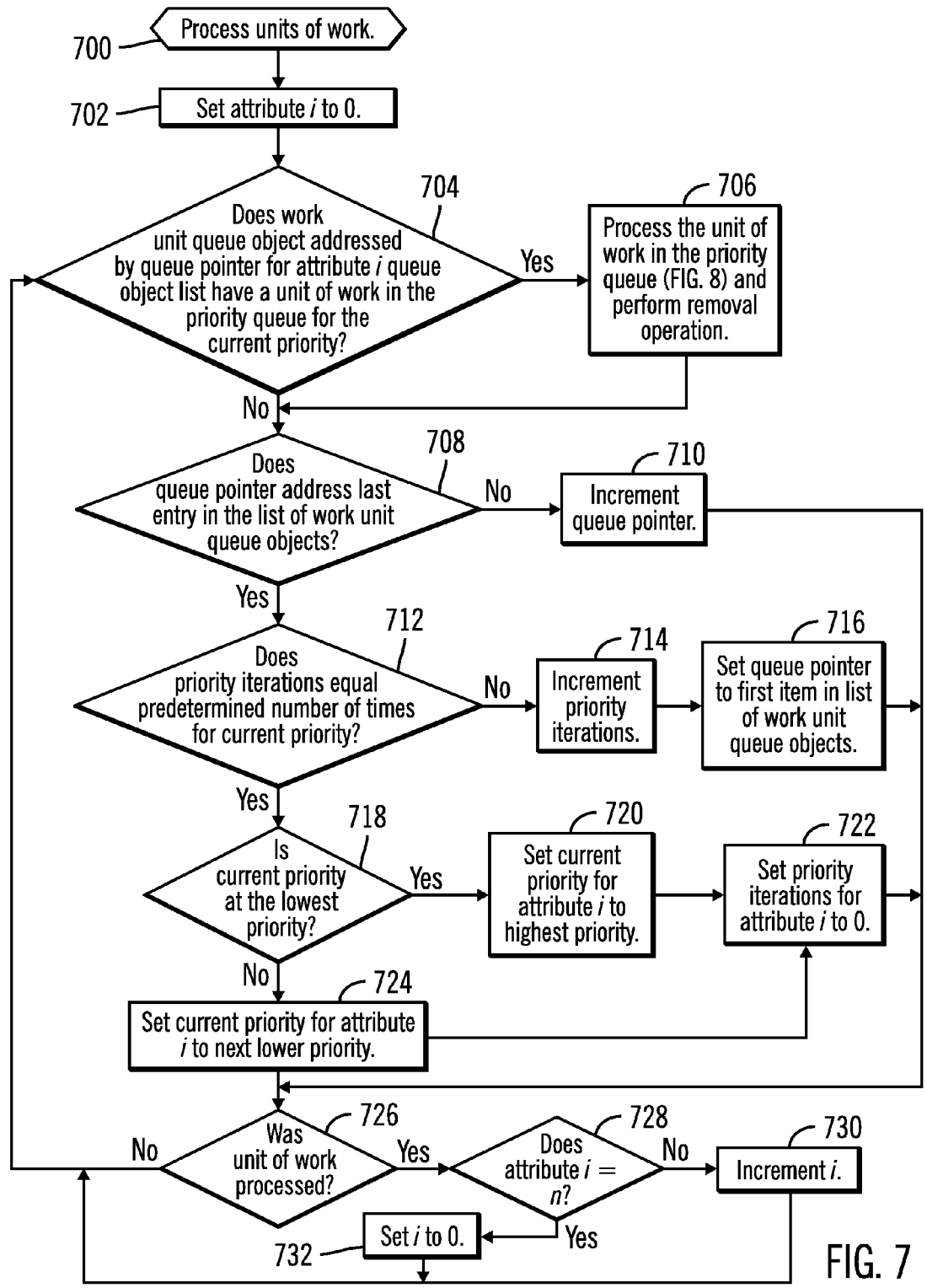
FIG. 7 illustrates an embodiment of operations to select a unit of work from one of the queues.

FIG. 7 illustrates an embodiment of operations performed by the workload manager 108 to process units of work 200 from the priority queues $308_{i,j,k}$ by alternating processing the work unit queue list $400_i$ for different attributes i. Upon initiating (at block 700) unit of work processing, the workload manager 108 sets (at block 702) attribute i to zero, for the first attribute type. If (at block 704) the queue object $300_{i,j}$ addressed by the queue pointer 406 in the queue object list $400_i$ for attribute i has a unit of work in the priority queue $308_{i,j,k}$ for the current priority 408, then the workload manager 108 may process (at block 706) the unit of work, which may comprise the unit of work at the top of the priority queue $308_{i,j,k}$. To process the unit of work, the workload manager 108 may perform the operations of FIG. 8 to break the unit of work into sub-units of work to queue on the work sub-unit priority queues $320_{i,j,k}$ to be processed by the work sub-unit processes 109, which may independently process work sub-unit queue object lists $420_m$ to select work sub-unit queues $320i,j$ to process to select work sub-units to process. In one embodiment, there may be a separate work sub-unit process 109 to independently process one of the work sub-unit queue object lists $420_m$ to select work sub-unit queues $320_{i,j}$ to process.

At block 706, the workload manager 108 may further remove the processed unit of work from the queues. The workload manager 108 may remove the record for the processed unit of work, addressed by the queue pointer 406 from each of the plurality of priority queues $308_{i,j,k}$ for all the work unit queue objects $300_{i,j}$ including the selected record. Thus, the record is removed from all the priority queues across all work unit attribute types in which the work unit record was previously included for a given priority k. If any of the work unit queue objects $300_{i,j}$ from which the record was removed have all empty priority queues 308, then those empty work unit queue objects $300_{i,j}$ are also removed from the queue object lists $400_i$ in which they were included for all attribute types.

If (at block 704) there is no unit of work to process or after processing the unit of work (at block 706), if (at block 708) the queue pointer 406 does not address the last entry in the list of work unit queue objects 412, then the queue pointer is incremented (at block 710).

If (at block 708) the queue pointer 406 does address the last entry and if (at block 712) the priority iterations 410 does not equal the predetermined number of times for the current priority 408, i.e., the maximum number of iterations the list 412 is processed for the current priority 408, then the workload manager 108 increments (at block 714) the priority iterations 410 and sets (at block 716) the queue pointer 406 to the first item in the list 412 of work unit queue objects. If (at block 712) the priority iterations 410 does equal the predetermined number for the current priority 408, and if (at block 718) the current priority 408 is not at the lowest priority, then the workload manager 108 sets (at block 720) the current priority 408 for attribute i to the highest priority and sets (at block 722) the priority iterations 410 for attribute i to zero to cycle again through the priorities for the queue object list $400_i$ for attribute i. In certain embodiments, each priority may be associated with a different predetermined number of times of iterations for which the work unit queues $308_{i,j,k}$ are to be processed for priority k. In certain embodiments, higher priorities may be associated with a higher number of predetermined number of times so that work unit queues for a higher priority are processed in more iterations than work unit queues of a lower priority.

If (at block 718) the current priority 408 is not at the lowest priority, then the workload manager 108 sets (at block 724) the current priority 408 in the queue object list $400_i$ for attribute i to the next lower priority and proceeds to block 722.

After adjusting the queue pointer 406 at block 710 or 716 or adjusting the priority iterations at block 722, if (at block 726) a unit of work was not processed during the current iteration, such as at block 706, then control proceeds back to block 704 to continue to scan the list 412 to find a unit of work to process. Otherwise, if (at block 726) a unit of work was processed at block 706, then the workload manager 108 alternates to processing a queue object list $400_i$ for another attribute by determining (at block 728) whether the attribute i is n, for the last attribute type. If so, i is set to 0 and if not, i is incremented, and then control proceeds back to block 704 to process the queue object list $400_i$ for another attribute type.

With the described embodiments of FIGS. 6 and 7, a record for a single unit of work is placed on multiple work unit priority queues, or on each queue that corresponds to an attribute value for an attribute type associated with the unit of work. When the workload manager 108 then cycles through processing the work unit priority queues for different attribute types and priorities, that unit of work may be selected from any of the work unit priority queues $308_{i,j,k}$ to which it was added. In this way, the selection of units of work 200 to process are balanced across the attribute types, attribute values, and priorities associated with the unit of work.

Figure 8:
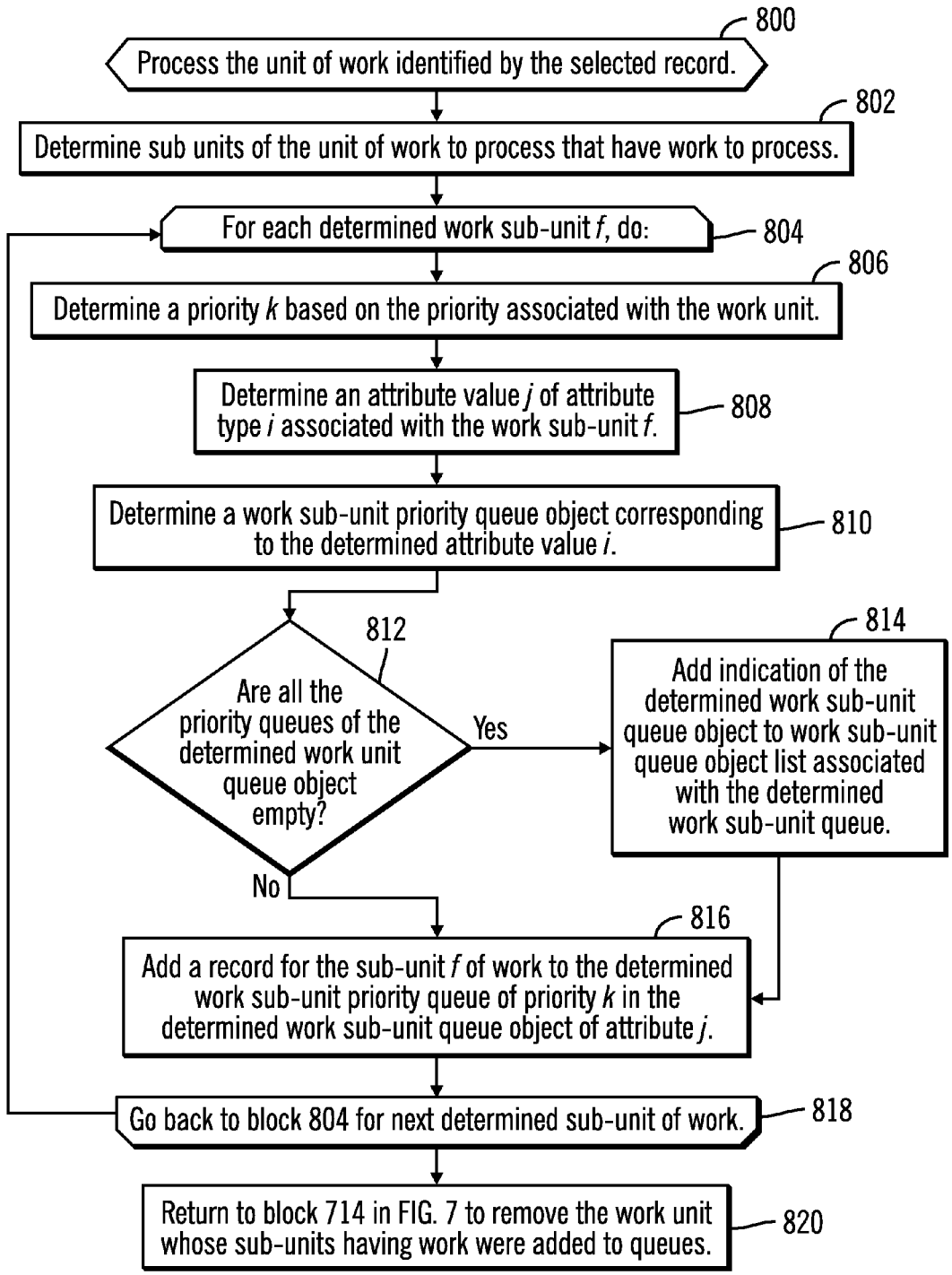
FIG. 8 illustrates an embodiment of operations to process the sub-units of work when processing a unit of work to add records to the work sub-unit queues for the sub-units of work to process.

FIG. 8 illustrates an embodiment of operations performed by the workload manager 108 to process the sub-units of work of the processed unit of work, which is processed at block 712 in FIG. 7. Upon initiating (at block 800) operations to process the sub-units of work, the workload manager 108 determines (at block 802) sub-units of the unit of work to process that have work to process. Not all of the sub-units of the unit of work may have work to process and, in such case, only those sub-units of work having work are processed. A loop of operations is performed at blocks 804 through 818 for each determined sub-unit f of work having work to process. At block 806, the workload manager 108 determines (at block 806) a priority k based on the priority associated with the work unit. The priority k may be derived from the unit of work priority, such as adjusting it upward or downward, or may be the priority of the unit of work. The workload manager 108 determines (at block 808) an attribute value j associated with the work sub-unit f and determines (at block 810) a work sub-unit queue $320_{i,j,k}$ corresponding to the determined attribute value j and priority k. If (at block 812) the determined work sub-unit queue $320_{i,j,k}$ is empty, then indication of the determined work sub-unit queue $320_{i,j,k}$ is added (at block 814) to the work sub-unit queue object list $420_i$.

If (at block 812) the determined work sub-unit queue $320_{i,j,k}$ is not empty or after adding indication of the empty work sub-unit queue to the work sub-unit queue object list $420_i$ (at block 814), then the workload manager 108 adds (at block 816) a record for the sub-unit of work to the queued records 310 for the determined work sub-unit queue $320_{i,j,k}$. Control then proceeds (at block 818) back to block 804 until processing is performed for all of the determined sub-units having work to process. After adding records for all the sub-units of work to the sub-unit work queues $320_{i,j,k}$, control then returns (at block 820) to block 714 in FIG. 7 to complete processing the unit of work after all the sub-units of the unit of work are added to the work sub-unit queues.

In certain embodiments, sub-units of work from one unit of work that have different attribute values for a priority are added to different work sub-unit queues. In this way, sub-units of work for different units of work may be queued on one work sub-unit queue $310_{i,j,k}$ to balance the processing of sub-units of work across attribute values and priorities of the sub-units of work.

Figure 9:
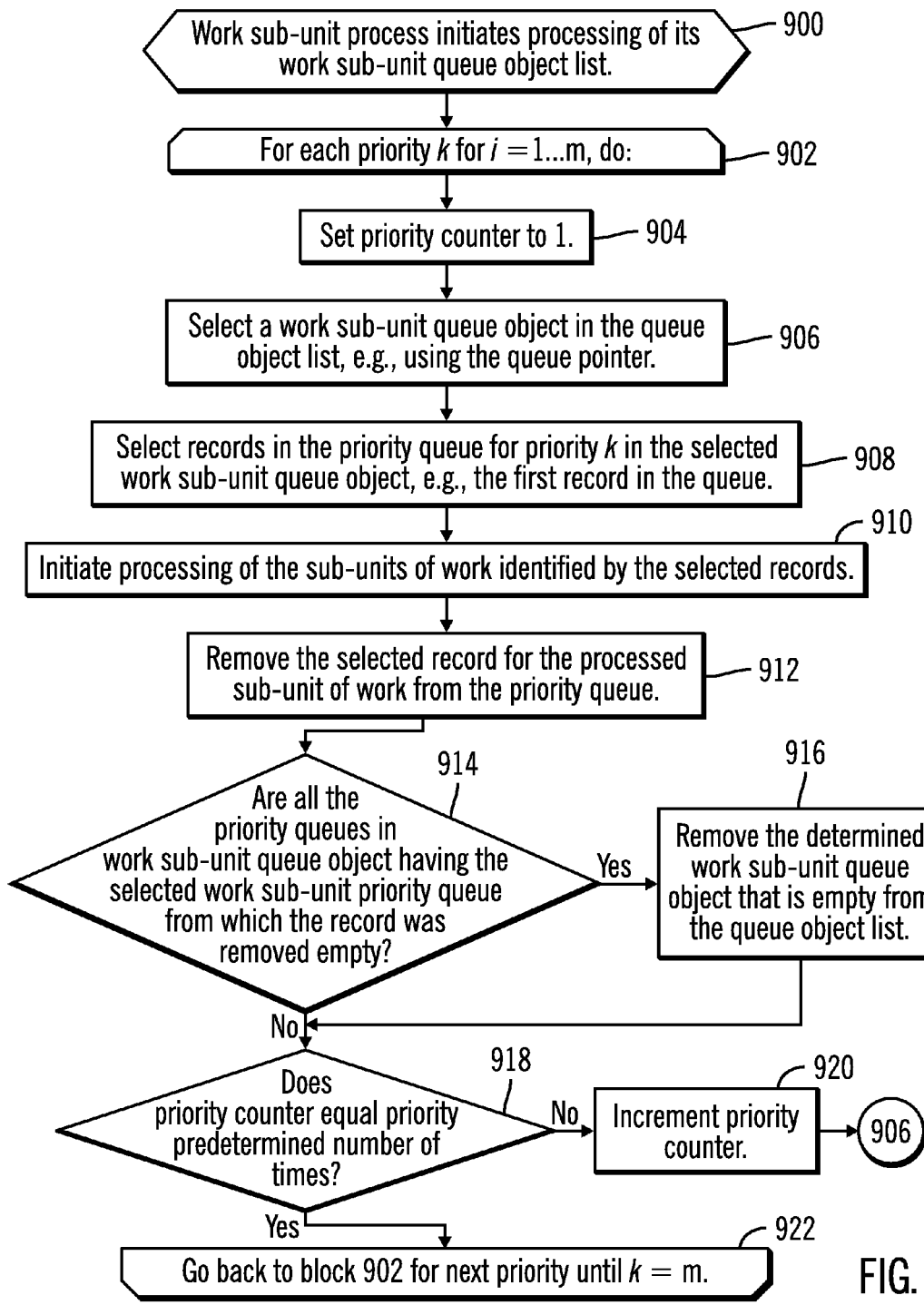
FIG. 9 illustrates an embodiment of operations to select a sub-unit of work from one of the work sub-unit queues.

FIG. 9 illustrates an embodiment of operations the sub-unit processes 109 perform to process a sub-unit of work from the work sub-unit queues 112. Upon initiating (at block 900) processing of a sub-unit of work, a work sub-unit process 109 initiates a loop of operations at blocks 902 through 922 for each priority k value of m priority values that may be associated with sub-units of work to determine the work sub-unit queue. A priority counter is set (at block 904) to one indicating a number of iterations of processing the work sub-unit process 109 performs for priority k. The work sub-unit process 109 selects (at block 906) a work sub-unit queue object $320_{i,j}$ in the queue object list $420i$ following the last processed work sub-unit queue object in the list, e.g., using the queue pointer 406. Records are selected (at block 908) in the priority queue $308_{i,j,k}$ for priority k in the selected work sub-unit queue object $320_{i,j}$, such as the first record in the queue. Processing is initiated (at block 910) of the sub units of work identified by the selected records. The selected record is removed (at block 912) for the processed sub-unit of work from the priority queue $308_{i,j,k}$.

If (at block 914) all the priority queues in the work sub-unit queue object $320i,j$ having the selected work sub-unit priority queue from which the records were removed are empty, then that determined work sub-unit queue object $320i,j$ is removed (at block 916) from the queue object list $420i$. If (at block 914) all the priority queues $308_{i,j,k}$ for priority k in the work sub-unit queue object $320_{i,j}$ having the selected priority queue from which the records were removed are empty as a result of the removal, then that empty work sub-unit queue object $320_i$, is removed (at block 916) from the queue object list $420_i$. If (at block 918) the priority counter does not equal a priority predetermined number of times for the priority k, then the priority counter is incremented (at block 920) and control proceeds back to block 906 to perform another iteration of processing the work sub-unit queue object lists $420_i$. If (at block 918) the priority counter equals the predetermined number, indicating the work sub-unit queues have been processed for priority k the predetermined number of times, then control proceeds back to block 902 to process work sub-unit queues for the next priority until all m priorities are considered.

With the described embodiments of FIGS. 8 and 9, records for sub-units of work for a single unit of work may be placed on one or more work sub-unit queues, such that work sub-units from multiple units of work may be included on the same work sub-unit queue. The work sub-unit queues may be placed on an associated work sub-unit queue object list for a given priority. In this way, the selection of work sub-units to process are balanced based on the work sub-unit attributes of the work sub-unit queues for a given priority.

Figure 10:
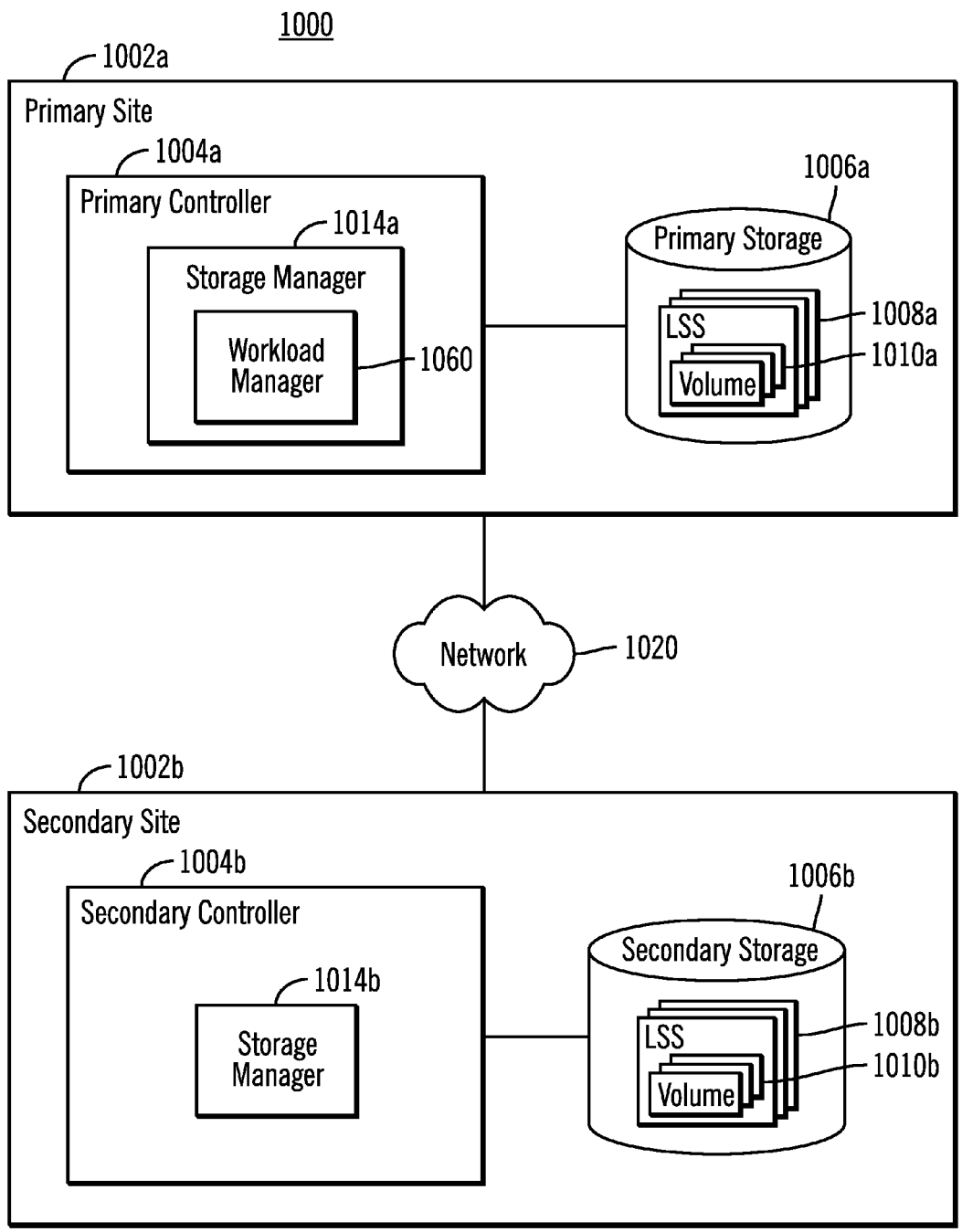
FIG. 10 illustrates an embodiment of a data storage environment.

FIG. 10 illustrates an embodiment of a storage environment 1000 in which the workload manager 108 may be deployed, having a primary site 1002a and a secondary site 1002b, where the secondary site 1002b provides a remote site backup of volumes and data at the primary site 1002a. One or more primary controllers 1004a at the primary site 1002a manage primary storages 1006a each having one or more logical subsystems (LSSs) 1008a providing a grouping of one or more volumes 1010a, where each volume 1010a stores a plurality of extents of data. The primary controller 1004a mirrors the volumes 1010a in their LSSs 1008a to a secondary controller 1004b at the secondary site 1002b over a network 1020 to store in secondary volumes 1010b in LSSs 1008b at the secondary storage 1006b at the secondary site 1002b. In this way, there is a mirror relationship between primary site 1002a volumes 1010a and secondary site 1002b volumes 1010b. The primary controller 1004a may implement the mirror relationship by copying all writes to extents in the volumes 1010a to the secondary controller 1004b to store in the secondary storage 1006b.

The volumes 1010a, 1010b may be allocated extents of data configured in the storages 1006a, 1006b, respectively, where each extent is assigned blocks or tracks of data in the storages 1006a, 1006b.

The primary controller 1004a includes a storage manager 1014a for managing the transfer or migration of data transferred between hosts (not shown) and the primary storage 1006a to the secondary controller 1004b to store on the secondary storage 1006b so that the secondary storage 1006b mirrors the data in the primary storage 1006a. In this way, writes to the primary storage 1006a may be transferred to the secondary controller 1004b to write to the secondary storage 1006b. The secondary controller 1004b also includes a storage manager 1014b for managing the storage of data from the primary controller 1004a and transfer of data with respect to hosts (not shown) to the secondary storage 1006b.

The storage manager 1014a may include a workload manager 1060 that comprises an implementation of the workload manager 108 described above with respect to FIGS. 1-8 to manage data transfer operations of volumes as units of work to be queued in different work unit queues based on attributes of the volumes 1010a to be transferred. The extents of a volume comprise the sub-units of work to include on the work sub-unit queues.

The storages 1006a and 1006b may store data in a Redundant Array of Independent Disks (RAID) configuration. The storages 1006a and 1006b may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 1020 may comprise one or more networks, such as one or more interconnected Local Area Networks (LAN), Storage Area Networks (SAN), Wide Area Network (WAN), peer-to-peer network, wireless network, etc.

Figure 11:
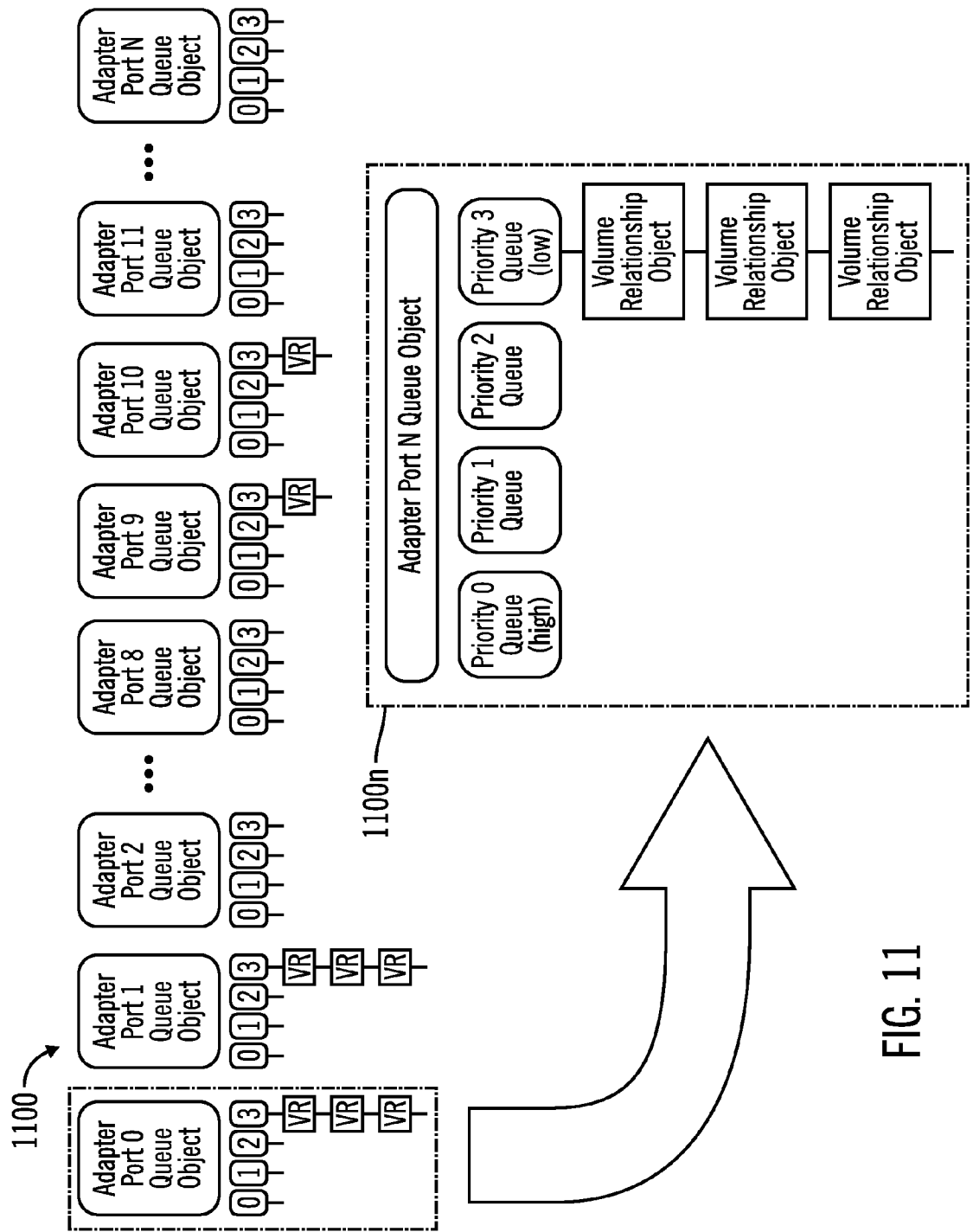
FIGS. 11 and 12 illustrate embodiments of work unit queue objects used in a data storage environment.
Figure 12:
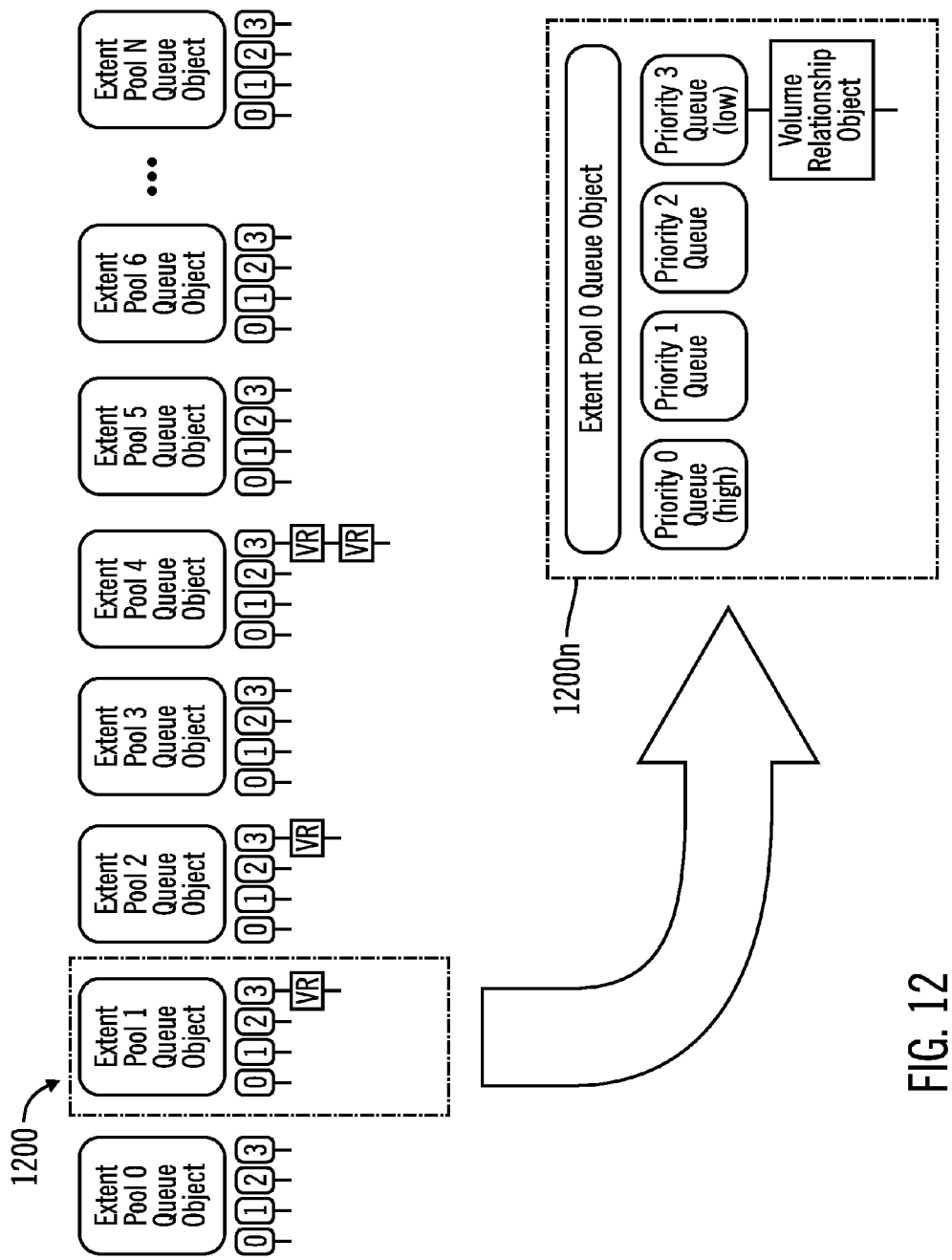

FIGS. 11 and 12 illustrate an embodiment of work unit object queue for two different work unit attribute types, an adapter port object queue and an extent pool object queue, respectively. For each of the possible adapter port $1100n$ and extent pool $1200n$ object queues, there are a separate priority queues for a plurality of priorities to allow a record for a volume transfer operation, also referred to as a volume relationship record (VR), to be added to one of the adapter port and extent pool queues according to the attribute value for the adapter port and extent pool and priority of the copy operation for the volume. The specific priority queues for the adapter port and extent pool queue objects are shown in the panels $1100n$ and $1200n$, which shows how for an adapter port and extent pool value, respectively, there is a separate priority queue for priorities 0, 1, 2, and 3. The record (VR)

for a volume to transfer may be added to each adapter port queue for a port in the paths over which the particular volume may be transferred for a given priority. The workload manager 1060 may then cycle through processing the different adapter port 1100 and extent pool queue 1200 queue objects for the adapter port attribute and extent pool attribute types, respectively, to process records for volumes to transfer according to the operations of FIGS. 6 and 7.

There may also be queue objects and priority queues for another attribute type, known as a resource group, where a resource group may identify a group of customers or quality of service requirements associated with the volume to transfer.

The priorities of a volume to transfer for which a VR record is added may be based on a priority associated with the state of the copy operation which is copying the volume represented by the VR record. For instance, an initial copy operation state to copy an entire volume may be associated with a different priority than the priority for a second phase following the initial phase that copies writes to the volume that occur during the initial phase or a previous phase. In one embodiment, the initial phase copy state may be associated with a lower priority than the second phase state. Further, if the copy operation has states related to forming a consistency group, then if a VR record is on one of the queues when the copy program performing copy operations with respect to the volume transitions to a new state, then a new priority may be derived based on the new state of the copy operation and the VR record may be moved to an adapter port or extent pool queue associated with the new priority. For instance, the new priority may be the same as the new state of the copy operation or a priority derived by incrementing or decrementing the priority associated with the new state.

In one embodiment, the additional states associated with the copy operation that cause a change in the priority associated with a queued VR record may comprise a forming a consistency group state during which the copy operation is creating a consistency group to have dependent updates that are consistent; a consistency group idle state when a consistency group has been successfully formed, and a consistency group monitor state when the copy operation failed to form a consistency group state. In one embodiment, the forming a consistency group state may have a highest priority, the consistency group monitor state may be associated with a next highest priority, the consistency group idle state and second copy state may be associated with a third highest priority level, and an initial copy may be associated with the fourth highest priority level.

Figure 13:
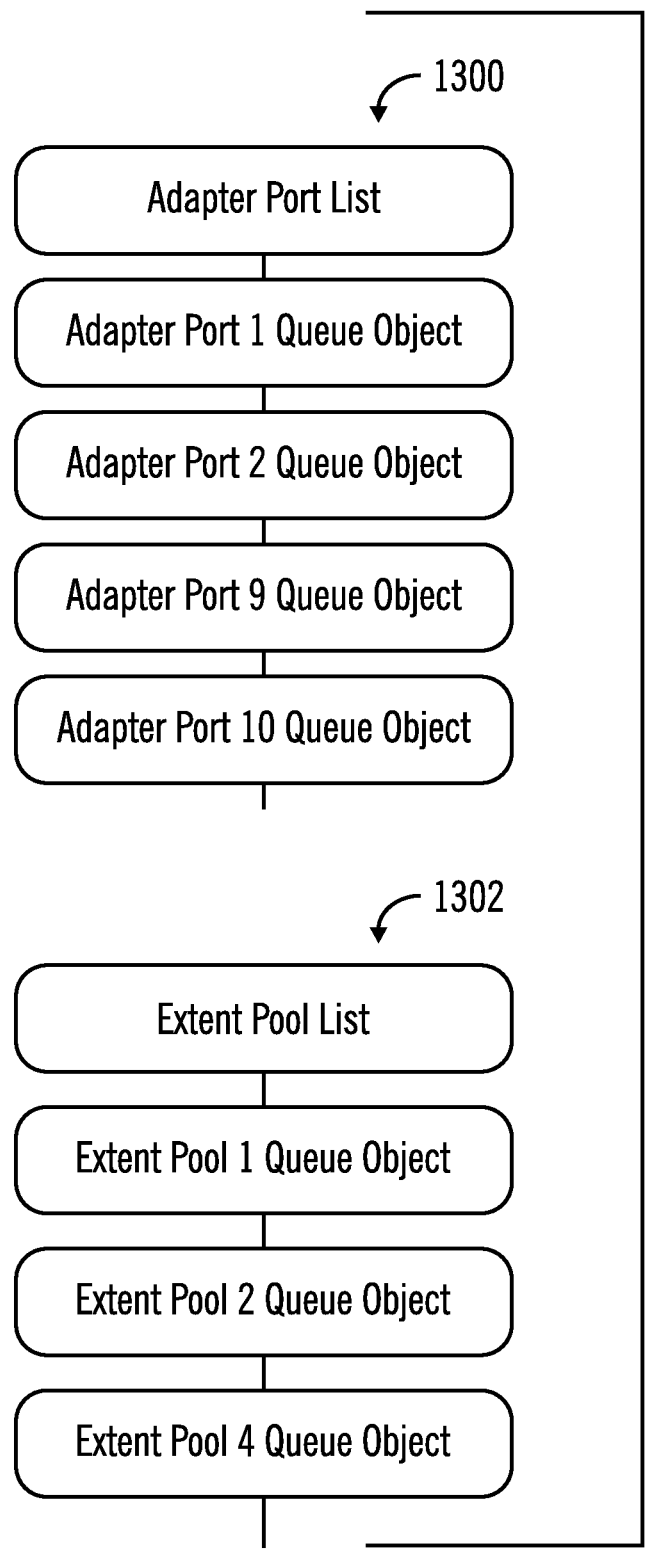
FIG. 13 illustrates an embodiment of a queue object list used to select units of work to process in the data storage environment.

FIG. 13 provides an embodiment of the work unit queue object lists 1300 and 1302 for the adapter port attribute type and the extent pool attribute type that include the non-empty adapter port queue objects 1100 and extent pool queue objects 1200 having records to process. The workload manager 1060 may then alternate between cycling through these lists 1300 and 1302 as described with respect to FIG. 7 to determine adapter port queue objects 1100 and extent pool queue objects 1200 from which to select a priority queue and a volume relationship (VR) record from the selected priority queue to perform the transfer operation for the volume identified in the selected volume relationship record.

The queues shown in FIGS. 11 and 12 may be processed according to the operations described with respect to FIGS. 6 and 7. Each time there is work to be done to synchronize a volume on the primary controller 1004*a* to a volume 1010*b* on the secondary controller 1004*b*, a Volume Relationship Object (VR) instance is added to multiple queues 1100 and 1200. Each VR instance contains information on the adapter ports which can be utilized for synchronization and contains the extent pool associated with the volume. The priority for a VR object is assigned based on the copy relationship state and the synchronization phase. The VR Object instance is added to the end of the priority queue with the corresponding priority in each of the adapter port queue object having an adapter port attribute value of the VR object. The VR object is also added to the end of the priority queue with the corresponding priority for the extent pool queue object having an extent pool attribute value of the VR object.

In certain embodiments, the higher priority queues are serviced more often than the lower priority queues. For example, when adapter port queue objects 1100*n* instances are being serviced, the first adapter port queue object 1100 instance would have its Priority 0 queue serviced. The next time, the second adapter port queue object instance would have its Priority 0 queue serviced. This would continue on through all of the adapter port queue object instances and then would be repeated for all of them for Priority 0 for a highest number of times. Then the operations to process the queues would be repeated for each of the priorities for a predetermined number of times based on the priority, where the predetermined number of times is higher for higher priorities.

Figure 14:
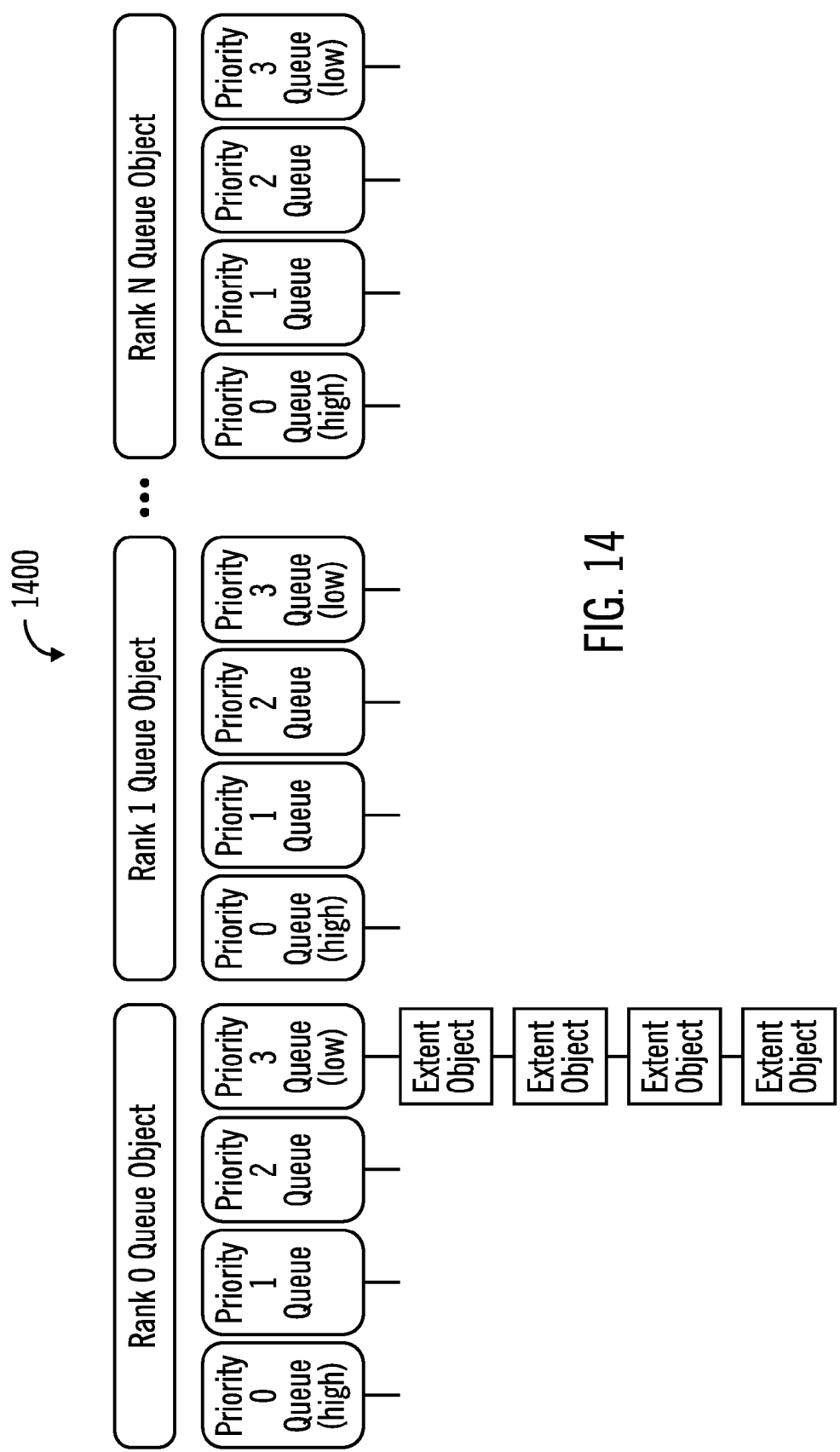
FIG. 14 illustrates an embodiment of work sub-unit queue objects used in a data storage environment.

FIG. 14 provides an embodiment of the work sub-unit queues as RAID rank queue objects, where an extent of the volume comprises the sub-unit of work to transfer. An extent object record for the extent of the volume to transfer is placed on the priority queue in the rank queue object 1400 queue corresponding to the RAID rank in the primary storage 1006*a* in which the extent is stored and for the priority associated with the extent, which may be derived from the priority for the volume. If extents from a volume 1010*a* are stored in different RAID ranks, then the records for those extents would be placed on priority queues in different rank queue objects 1400.

Each time an extent needs to be synchronized, the associated extent object instance is added to the end of the priority queue with the corresponding priority for the rank queue object instance. The higher priority queues may be serviced more frequently than the lower priority queues. For example, the first rank 1 queue object would have its Priority 0 queue serviced. The next time, the second rank 2 queue object would have its Priority 0 queue serviced. This would continue on through all of the rank queue objects and then would be repeated for all of them for Priority 0 for a predetermined number of times, higher then the number of times associated with lower priorities. The processing of the rank queue objects would be repeated for all of them for each of the next priorities.

Figure 15:
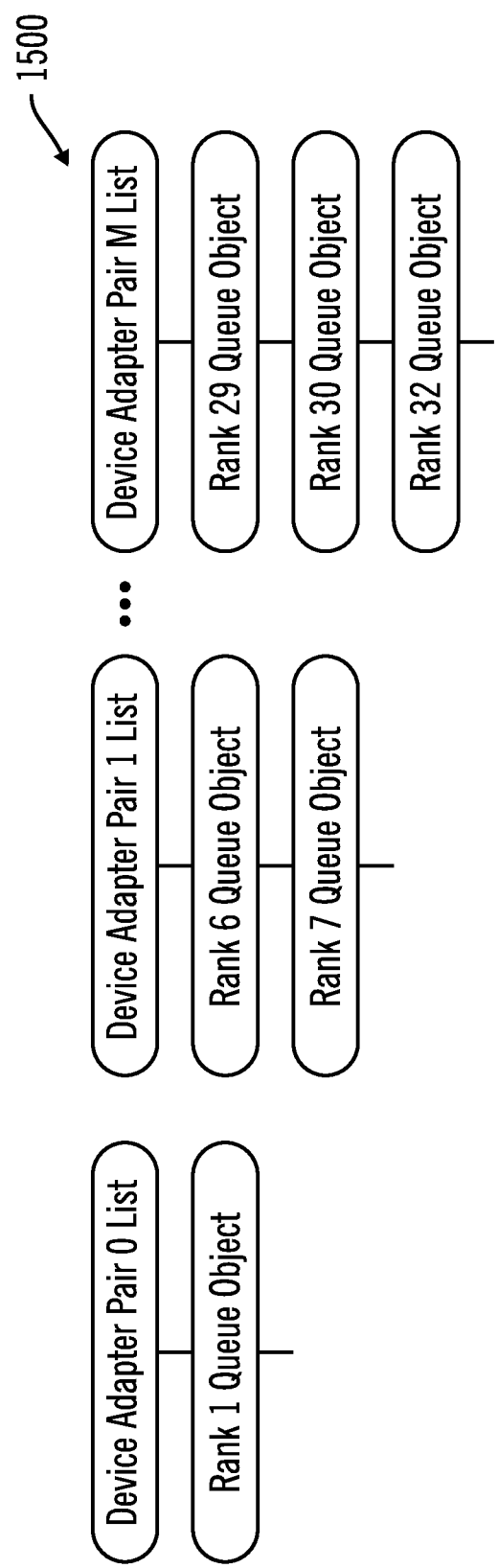
FIG. 15 illustrates an embodiment of work sub-unit queue object lists used in a data storage environment.

Each RAID rank in the primary storage 1006*a* may be accessed by a pair of device adapters in the primary controller 1002*a*. The work sub-unit queue object lists may comprise device adapter pair lists 1500 shown in FIG. 15, such that a rank queue object is indicated in the device adapter pair list 1500 for the device adapter pair that is used to access the rank represented by the rank queue object. A plurality of device adapter pair processes, such as the work-sub unit processes 109, may process the device adapter pair lists 1500, wherein there may be one device adapter pair process or agent for each device adapter pair list 1500. Each device adapter pair process may process its respective device adapter pair list 1500 to select a rank queue from the list from which to select an extent (work sub-unit) to copy. This balances selections of extents for one or more units of work to transfer according to the RAID rank in which the extent is stored and the device adapter pair in the primary controller 1002*a* used to access that RAID rank.

The described embodiments provide techniques to distribute units of work and sub-units of work across different queues based on attribute type values and priorities associated with the units and sub-units of work. The workload manager and sub-unit processes may then cycle through processing the different queues to select a unit work and sub-units of work to process.

The reference characters used herein, such as f, i, j, k, l, m, n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 16:
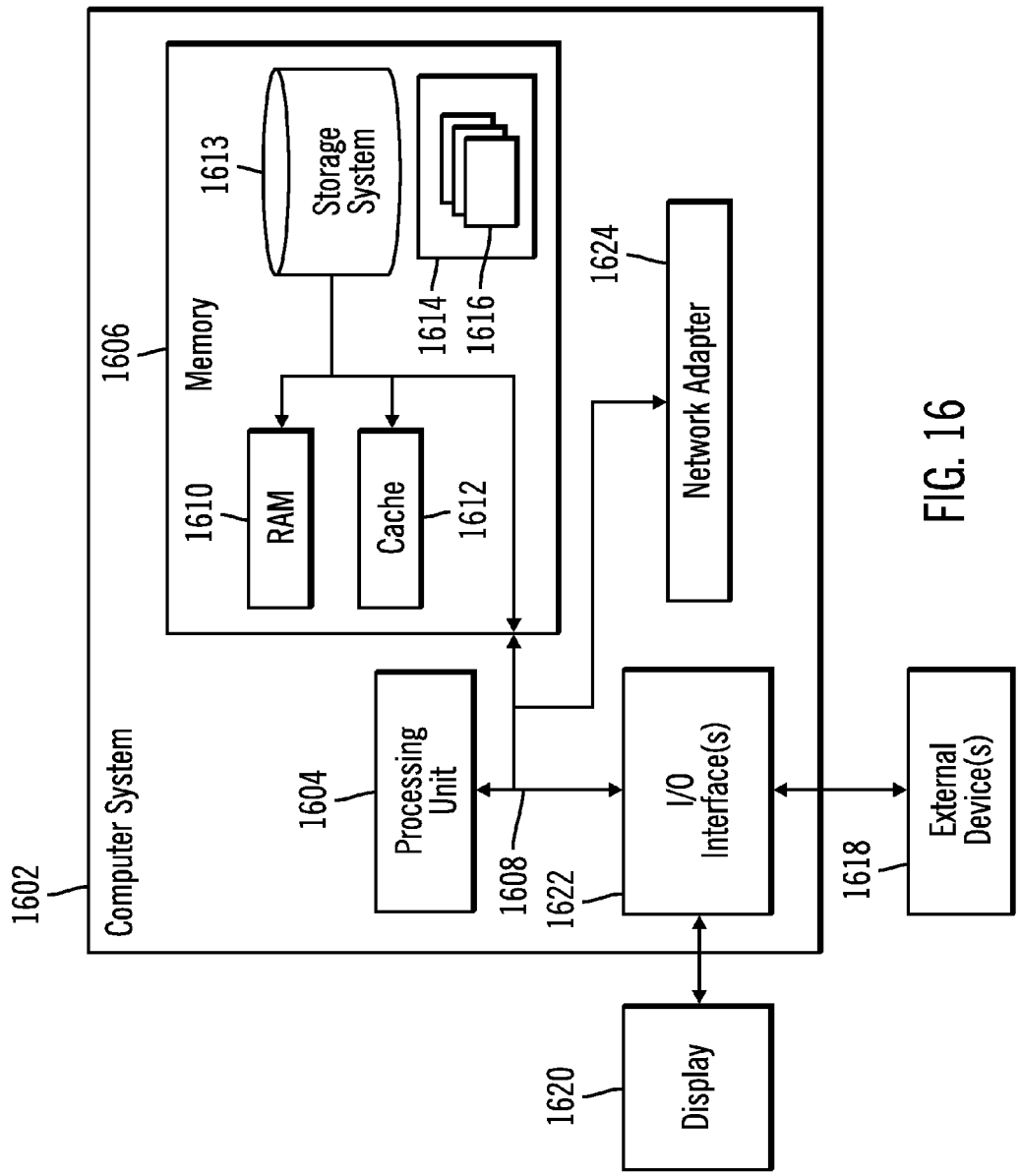
FIG. 16 illustrates a computing environment in which the components of FIGS. 1 and 10 may be implemented.

The computational components of FIG. 1, including the computing system 100 and FIG. 10 including the primary 1004a and secondary 1004b controllers may be implemented in one or more computer systems, such as the computer system 1602 shown in FIG. 16. Computer system/server 1602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, the computer system/server 1602 is shown in the form of a general-purpose computing device. The components of computer system/server 1602 may include, but are not limited to, one or more processors or processing units 1604, a system memory 1606, and a bus 1608 that couples various system components including system memory 1606 to processor 1604. Bus 1608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1602 typically includes a variety of computer system readable media. Such media may be any available media that is accessible by computer system/server 1602, and it includes both volatile and non-volatile media, removable and non-removable media.

System memory 1606 can include computer system readable media in the form of volatile memory, such as random access memory (RAM) 1610 and/or cache memory 1612. Computer system/server 1602 may further include other removable/non-removable, volatile/non-volatile computer system storage media. By way of example only, storage system 1613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1608 by one or more data media interfaces. As will be further depicted and described below, memory 1606 may include at least one program product having a set (e.g., at least one) of program modules that are configured to carry out the functions of embodiments of the invention.

Program/utility 1614, having a set (at least one) of program modules 1616, may be stored in memory 1606 by way of example, and not limitation, as well as an operating system, one or more application programs, other program modules, and program data. Each of the operating system, one or more application programs, other program modules, and program data or some combination thereof, may include an implementation of a networking environment. The components of the computer 1602 may be implemented as program modules 1616 which generally carry out the functions and/or methodologies of embodiments of the invention as described herein. The systems of FIG. 1 may be implemented in one or more computer systems 1602, where if they are implemented in multiple computer systems 1602, then the computer systems may communicate over a network.

Computer system/server 1602 may also communicate with one or more external devices 1618 such as a keyboard, a pointing device, a display 1620, etc.; one or more devices that enable a user to interact with computer system/server 1602; and/or any devices (e.g., network card, modem, etc.) that enable computer system/server 1602 to communicate with one or more other computing devices. Such communication can occur via Input/Output (I/O) interfaces 1622. Still yet, computer system/server 1602 can communicate with one or more networks such as a local area network (LAN), a general wide area network (WAN), and/or a public network (e.g., the Internet) via network adapter 1624. As depicted, network adapter 1624 communicates with the other components of computer system/server 1602 via bus 1608. It should be understood that although not shown, other hardware and/or software components could be used in conjunction with computer system/server 1602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing units of work to process in a computing system, wherein the computer program product comprises a computer readable storage medium having program instructions embodied therewith, the program instructions executed by a processor to cause operations, the operations comprising:

maintaining a plurality of work unit queues, wherein each of the work unit queues are associated with different work unit attribute values of at least one attribute type that are associated with units of work, wherein a plurality of the work unit queues include records for units of work to process having work unit attribute values associated with the work unit attribute values of the work unit queues for one of the at least one attribute type, and wherein the work unit queues are each associated with a different priority of a plurality of priorities, and wherein each of the work unit queues are associated with one of the at least one attribute type, one of the work unit attribute values for the associated attribute type, and one of the priorities;

adding a record for a unit of work to perform to the work unit queue associated with a priority and work unit attribute value for an attribute type associated with the unit of work;

selecting one of the priorities;

selecting one of the work unit queues associated with the selected priority for one of the work unit attribute values;

selecting one of the records in the selected work unit queue; and executing the unit of work identified by the selected record, wherein the units of work to process comprise a computing task, application operation, storage access operation, database access operation, or data movement operation.

2. The computer program product of claim 1, wherein the selecting one of the records comprises selecting one of the records from one of the work unit queues for one of the at least one attribute type to process, wherein the operations further comprise:

removing the selected record from each of the plurality of work unit queues for one of the at least one attribute type in which the record is contained.

3. The computer program product of claim 1, wherein the operations further comprise:

for each of the priorities, performing:
performing for a predetermined number of times for the priority an iteration of consecutively processing each of the work unit queues for the work unit attribute values for the priority to access a record for one of the units of work, wherein a higher priority has a higher predetermined number of times than a lower priority.

4. The computer program product of claim 1, wherein the priority of the record added to the work unit queue is based on a state of a process creating the unit of work to add to the work unit queue, wherein different states of the process are associated with different priorities.

5. The computer program product of claim 4, wherein the operations further comprise:

receiving notification from the process that the state has changed;

determining a new priority for the state; and moving the record for the unit of work related to the process that had its state changed from one of the work unit queues having a priority different from the new priority to one of the work unit queues having the attribute value of the work unit queue from which the record was removed and associated with the new priority.

6. The computer program product of claim 1, wherein each unit of work is comprised of a plurality of sub-units of work, wherein the operations further comprise:

maintaining a plurality of work sub-unit queues, wherein each of the work sub-unit queues are associated with different work sub-unit attribute values and priorities that are associated with sub-units of work;

selecting a record for a unit of work from one of the work unit queues to process; and for each of the sub-units of work of the unit of work of the selected record, adding a record for the sub-unit of work to one of the work sub-unit queues having a priority based on the priority of the work unit queue from which the record was selected and associated with a work sub-unit attribute value of the sub-unit of work.

7. The computer program product of claim 6, wherein the operations further comprise:

for each of the priorities, performing:
performing for a predetermined number of times for the priority an iteration of consecutively processing each of the work sub-unit queues for the work sub-unit attribute values for the priority to access a record for one of the sub-units of work, wherein a higher priority has a higher predetermined number of times than a lower priority.

8. The computer program product of claim 6, wherein the work unit queues of different priorities for each of the work unit attribute values are associated with a work unit queue object indicating the attribute type, attribute value and work unit queues of the priorities for the indicated attribute type and value.

9. A computer program product for processing units of work to process in a computing system, wherein the computer program product comprises a computer readable storage medium having program instructions embodied therewith, the program instructions executed by a processor to cause operations, the operations comprising:

maintaining a plurality of work unit queues, wherein units of work to process represent volumes a copy process copies from a primary storage to a secondary storage, wherein the work unit queues are associated with attributes of the volumes to transfer, wherein the volumes are comprised of extents allocated to the volumes, wherein a plurality of the work unit queues include records for units of work to process having work unit attribute values associated with the work unit attribute values of the work unit queues for at least one attribute type, wherein the work unit queues are each associated with a different priority of a plurality of priorities, wherein the priorities associated with the work unit queues are associated with different states of the copy process that copies volumes from the primary storage to the secondary storage, and wherein each of the work unit queues are associated with one of the at least one attribute type, one of the work unit attribute values for the associated attribute type, and one of the priorities;

maintaining a plurality of Redundant Array of Independent Disk (RAID) rank queues for RAID ranks storing the extents of the volumes to transfer and associated with one of the plurality of priorities;

adding a record to one of the work unit queues associated with a first priority if the copy process is in a state performing an initial copy of the volume associated with the record to the secondary storage; and adding the record to one of the work unit queues associated with a second priority if the copy process is in a state copying changed data following the initial copy.

10. The computer program product of claim 9 wherein the operations further comprise:

receiving a notification from the copy process that the copy process with respect to a volume has transitioned to a new copy process state comprising one of forming a consistency group state, succeeded forming consistency group state, and failed to form consistency group state;

determining a record in a current work unit queue comprising one of the work unit queues for the volume subject to the copy process that has a different priority than a priority for the new copy process state; and moving the determined record from the current work unit queue to one of the work unit queues having a priority based on a priority associated with the new copy process state in response to determining that the current work unit queue has the different priority.

11. The computer program product of claim 9, wherein the operations further comprise:

selecting a record for a volume from one of the work unit queues to process; and for each of the extents in the volume of the selected record, adding a record for the extent to one of the RAID rank queues for the RAID rank storing the extent and having a priority based on the priority of the work unit queue from which the record was selected.

12. A system for processing units of work to process in a computing system, wherein each unit of work is comprised of a plurality of sub-units of work, comprising:

a processor; and a computer readable storage medium having program instructions embodied therewith, the program instructions executed by the processor to cause operations, the operations comprising:

maintaining a plurality of work unit queues, wherein each of the work unit queues are associated with different work unit attribute values of at least one attribute type that are associated with units of work, wherein a plurality of the work unit queues include records for units of work to process having work unit attribute values associated with the work unit attribute values of the work unit queues for one of at least one attribute type, and wherein the work unit queues are each associated with a different priority of a plurality of priorities, and wherein each of the work unit queues are associated with one of the at least one attribute type, one of the work unit attribute values for the associated attribute type, and one of the priorities;

adding a record for a unit of work to perform to the work unit queue associated with a priority and work unit attribute value for an attribute type associated with the unit of work;

selecting one of the priorities;

selecting one of the work unit queues associated with the selected priority for one of the work unit attribute values;

selecting one of the records in the selected work unit queue; and executing the unit of work identified by the selected record, wherein the units of work to process comprise a computing task, application operation, storage access operation, database access operation, or data movement operation.

13. The system of claim 12, wherein the operations further comprise:

for each of the priorities, performing:

performing for a predetermined number of times for the priority an iteration of consecutively processing each of the work unit queues for the work unit attribute values for the priority to access a record for one of the units of work, wherein a higher priority has a higher predetermined number of times than a lower priority.

14. The system of claim 12, wherein the priority of the record added to the work unit queue is based on a state of a process creating the unit of work to add to the work unit queue, wherein different states of the process are associated with different priorities.

15. The system of claim 12, wherein each unit of work is comprised of a plurality of sub-units of work, wherein the operations further comprise:

maintaining a plurality of work sub-unit queues, wherein each of the work sub-unit queues are associated with different work sub-unit attribute values and priorities that are associated with sub-units of work;

selecting a record for a unit of work from one of the work unit queues to process; and for each of the sub-units of work of the unit of work of the selected record, adding a record for the sub-unit of work to one of the work sub-unit queues having a priority based on the priority of the work unit queue from which the record was selected and associated with a work sub-unit attribute value of the sub-unit of work.

16. The system of claim 15, wherein the operations further comprise: for each of the priorities, performing:

performing for a predetermined number of times for the priority an iteration of consecutively processing each of the work sub-unit queues for the work sub-unit attribute values for the priority to access a record for one of the sub-units of work, wherein a higher priority has a higher predetermined number of times than a lower priority.

17. A method computer program product for processing units of work to process in a computing system comprising a processor, wherein each unit of work is comprised of a plurality of sub-units of work, the method executed by the processor, comprising:

maintaining a plurality of work unit queues, wherein each of the work unit queues are associated with different work unit attribute values of at least one attribute type that are associated with units of work, wherein a plurality of the work unit queues include records for units of work to process having work unit attribute values associated with the work unit attribute values of the work unit queues for one of the at least one attribute type, and wherein the work unit queues are each associated with a different priority of a plurality of priorities, and wherein each of the work unit queues are associated with one of the at least one attribute type, one of the work unit attribute values for the associated attribute type, and one of the priorities;

adding a record for a unit of work to perform to the work unit queue associated with a priority and work unit attribute value for an attribute type associated with the unit of work;

selecting one of the priorities;

selecting one of the work unit queues associated with the selected priority for one of the work unit attribute values;

selecting one of the records in the selected work unit queue; and executing the unit of work identified by the selected record, wherein the units of work to process comprise a computing task, application operation, storage access operation, database access operation, or data movement operation.

18. The method of claim 17, further comprising:
for each of the priorities, performing:
performing for a predetermined number of times for the priority an iteration of consecutively processing each of the work unit queues for the work unit attribute values for the priority to access a record for one of the units of work, wherein a higher priority has a higher predetermined number of times than a lower priority.

19. The method of claim 17, wherein the priority of the record added to the work unit queue is based on a state of a process creating the unit of work to add to the work unit queue, wherein different states of the process are associated with different priorities.

20. The method of claim 17, wherein each unit of work is comprised of a plurality of sub-units of work, further comprising:
maintaining a plurality of work sub-unit queues, wherein each of the work sub-unit queues are associated with different work sub-unit attribute values and priorities that are associated with sub-units of work;
selecting a record for a unit of work from one of the work unit queues to process; and
for each of the sub-units of work of the unit of work of the selected record, adding a record for the sub-unit of work to one of the work sub-unit queues having a priority based on the priority of the work unit queue from which the record was selected and associated with a work sub-unit attribute value of the sub-unit of work.

21. The method of claim 20, further comprising:
for each of the priorities, performing:
performing for a predetermined number of times for the priority an iteration of consecutively processing each of the work sub-unit queues for the work sub-unit attribute values for the priority to access a record for one of the sub-units of work, wherein a higher priority has a higher predetermined number of times than a lower priority.

22. A system for processing units of work to process in a computing system, wherein each unit of work is comprised of a plurality of sub-units of work, comprising:
a processor; and
a computer readable storage medium having program instructions embodied therewith, the program instructions executed by the processor to cause operations, the operations comprising:
maintaining a plurality of work unit queues, wherein the units of work to process represent volumes a copy process copies from a primary storage to a secondary storage, wherein the work unit queues are associated with attributes of the volumes to transfer, wherein the volumes are comprised of extents allocated to the volumes, wherein a plurality of the work unit queues include records for units of work to process having work unit attribute values associated with the work unit attribute values of the work unit queues for one of at least one attribute type, wherein the work unit queues are each associated with a different priority of a plurality of priorities, wherein the priorities associated with the work unit queues are associated with different states of the copy process that copies volumes from the primary storage to the secondary storage, and wherein each of the work unit queues are associated with one of the at least one attribute type, one of the work unit attribute values for the associated attribute type, and one of the priorities;
maintaining a plurality of Redundant Array of Independent Disk (RAID) rank queues for RAID ranks storing the extents of the volumes to transfer and associated with one of the plurality of priorities;
adding a record to one of the work unit queues associated with a first priority if the copy process is in a state performing an initial copy of the volume associated with the record to the secondary storage; and
adding the record to one of the work unit queues associated with a second priority if the copy process is in a state copying changed data following the initial copy.

23. A method implemented in a computer program product for processing units of work to process in a computing system comprising a processor, wherein each unit of work is comprised of a plurality of sub-units of work, the method executed by the processor, comprising:
maintaining a plurality of work unit queues, wherein the units of work to process represent volumes a copy process copies from a primary storage to a secondary storage, wherein the work unit queues are associated with attributes of the volumes to transfer, wherein the volumes are comprised of extents allocated to the volumes, wherein a plurality of the work unit queues include records for units of work to process having work unit attribute values associated with the work unit attribute values of the work unit queues for at least one attribute type, and wherein the work unit queues are each associated with a different priority of a plurality of priorities, wherein the priorities associated with the work unit queues are associated with different states of the copy process that copies volumes from the primary storage to the secondary storage, and wherein each of the work unit queues are associated with one of the at least one attribute type, one of the work unit attribute values for the associated attribute type, and one of the priorities;

maintaining a plurality of Redundant Array of Independent Disk (RAID) rank queues for RAID ranks storing the extents of the volumes to transfer and associated with one of the plurality of priorities;

adding a record to one of the work unit queues associated with a first priority if the copy process is in a state performing an initial copy of the volume associated with the record to the secondary storage; and adding the record to one of the work unit queues associated with a second priority if the copy process is in a state copying changed data following the initial copy.

\* \* \* \* \*